United States Patent Office 2,695,892
Patented Nov. 30, 1954

2,695,892

COMPOSITION FOR COMBATING FOAM

Gaston Jaccard and Klaus Stockar, Basel, Switzerland, assignors to Sandoz Limited, Basel, Switzerland, a firm of Switzerland No Drawing. Application December 20, 1949,
Serial No. 134,132

Claims priority, application Switzerland
December 24, 1948

4 Claims. (Cl. 252—358)

The present invention relates primarily to new antifoaming agents containing at most 15 carbon atoms in the molecule and corresponding to the following general formula $$R_1X_1R_2X_2R_3$$

wherein $R_1$ and $R_3$ denote straight chain or branched aliphatic hydrocarbon radicals, $R_2$ denotes a straight chain or branched hydroxyalkylene radical containing 3 to 5 carbon atoms and each $X_1$ and $X_2$ denotes oxygen or sulphur.

A further object of the present invention is a method for combating foams by using anti-foaming agents of the above general formula.

The compounds of the above described formula can be prepared by known etherification processes, e. g. from polyvalent alcohols or thioalcohols of the formula $HX_1R_2X_2H$ or their alkali derivatives and halides of the formula $R_1$-halogen and $R_3$-halogen or from dihalogenhydrins or from epihalogenhydrins of the alcohol $$HX_1R_2X_2H$$

and aliphatic monovalent alcohols or mercaptans, whereby in the case where the two radicals $R_1$ and $R_3$ are different from one another it is advantageous to add first one of the two alkyl radicals and then the other to the molecule to be etherified.

Ethers of the above described formula which are particularly suitable are for example di-n-butyl-, di-iso-butyl-, di-sec-butyl-, di-n-propyl-, di-isopropyl-, various isomeric di-pentyl-, propyl-butyl-, propyl-pentyl-, propyl-hexyl-, ethyl-butyl-, ethyl-pentyl-, ethyl-hexyl-, ethyl-heptyl-, ethyl-octyl-, methyl-butyl-, methyl-pentyl-, methyl-hexyl-, methyl-octyl- and methyl-nonyl-glycerol ethers.

Instead of the glycerol ethers, however, ethers of glycerol homologues such as ethers of methyl glycerol or ethers of thioglycerol and dithioglycerol as well as their homologues can be used with advantage.

Each of the ethers named above can be used alone or a mixture of such ethers can also successfully be used. The said ethers can also be dissolved in suitable solvents, e. g. isopropyl alcohol or suitable low boiling alcohols, or the same can be emulsified in water, whereby the necessary emulsifier, e. g. a non-ionic emulsifier, such as lauryl polyglycol ether, iso-octyl phenyl polyglycol ether and the like can be added either to the particular ether or to a solution thereof in a solvent or added to the water. The ethers previously enumerated can also be used in combination with known anti-foaming agents.

In anti-foaming, one can either be concerned with destroying foam which has already been formed, or simply with preventing foam. In the first named case compounds of the previously described formula or preparations containing these compounds, are added in as fine a state and as regularly as possible to the foam. In the latter case such media are added to the liquid or to the material which is liable to form a foam.

The following examples illustrate the invention without however limiting the same.

Example 1

90 grams of 1,3-di-isobutyl-glycerol ether are mixed with 10 grams of dodecyl-polyglycol ether containing 6 ethenoxy groups in the molecule and the mixture is emulsified in 1400 cm.³ of water. The emulsion thus obtained is fairly stable, but it is advisable to shake it before using.

If 5 drops of this emulsion are spread on the foam produced by shaking 500 cm.³ of a 0.2% potassium oleate solution of 40° C. in a 1000 cm.³ graduated glass cylinder the foam begins to fall down, at such a rate, that after one minute about 30% of it has disappeared.

Similar results are obtained if the di-iso-butyl-glycerol ether is replaced by any other glycerol ether mentioned in the present specification and if the lauryl-polyglycol ether is replaced by any other polyglycol ether having similar properties.

Example 2

75 grams of di-n-butylglycerol ether and 25 grams of isopropyl alcohol are mixed together.

If 10 drops of this mixture are spread on a foam produced by shaking 500 cm.³ of an aqueous solution containing ½ gram of the sodium salt of lauryl sulfate at 40° C. in a 1000 cm.³ graduated glass cylinder, the foam begins to fall at such a rate, that after one minute about 45% of it has disappeared.

Similar results are obtained if the di-n-butylglycerol ether mentioned in this example is replaced by any other glycerol ether disclosed in the present specification and if the isopropyl alcohol is omitted or replaced by another low boiling monovalent alcohol such as methyl, ethyl or butyl alcohol.

What we claim is:

1. A foam-combating composition consisting of a compound selected from the group consisting of di-n-butyl-glycerol ether, di-iso-butyl glycerol ether and di-sec-butyl-glycerol ether, as the active ingredient, and of a member selected from the group consisting of alkyl polyglycol ether non-ionic emulsifiers and alkyl-phenyl polyglycol ether non-ionic emulsifiers in such a quantity, and not more, that the composition is emulsifiable in water.

2. A composition for combating foam consisting of 1,3-di-isobutyl-glycerol ether as the active ingredient and of dodecyl-hexaglycol ether as an emulsifying agent in such a quantity, and not essentially more, that the composition is emulsifiable in water.

3. A foam-combating aqueous emulsion consisting essentially of water and a compound selected from the group consisting of di-n-butyl-glycerol ether, di-iso-butyl glycerol ether and di-sec-butyl-glycerol ether, as the active ingredient, emulsified by a sufficient quantity, but not substantially more, of a member selected from the group consisting of alkyl polyglycol ether non-ionic emulsifiers. and alkyl-phenyl polyglycol ether non-ionic emulsifiers.

4. A foam-combating aqueous emulsion consisting essentially of water, and 1,3-di-isobutyl-glycerol ether as the active ingredient emulsified by a sufficient quantity, but not substantailly more, of dodecyl-hexaglycol ether.

References Cited in the file of this patent

UNITED STATES PATENTS

| Number | Name | Date |
|---|---|---|
| 2,356,550 | Volz | Aug. 22, 1944 |
| 2,453,352 | Tremain et al. | Nov. 9, 1948 |

FOREIGN PATENTS

| Number | Country | Date |
|---|---|---|
| 704,862 | Germany | Apr. 9, 1941 |

OTHER REFERENCES

Chemical Industries, May 1949, pages 757–759.